US008636116B2

(12) United States Patent
Fabris

(10) Patent No.: US 8,636,116 B2
(45) Date of Patent: Jan. 28, 2014

(54) BRAKE PAD FOR A BICYCLE

(75) Inventor: Paolo Fabris, Brendola (IT)

(73) Assignee: Campagnolo S.r.l., Vicenza (IT)

( * ) Notice: Subject to any disclaimer, the term of this patent is extended or adjusted under 35 U.S.C. 154(b) by 42 days.

(21) Appl. No.: 13/462,495

(22) Filed: May 2, 2012

(65) Prior Publication Data

US 2012/0279810 A1 Nov. 8, 2012

(30) Foreign Application Priority Data

May 2, 2011 (EP) .................................. 11425122

(51) Int. Cl.
B62L 1/02 (2006.01)

(52) U.S. Cl.
USPC ..................... 188/24.12; 188/251 A; 523/149

(58) Field of Classification Search
USPC ........ 188/24.12, 24.11, 24.13, 251 A, 250 B; 428/172; 523/149, 150, 152, 155–157
See application file for complete search history.

(56) References Cited

U.S. PATENT DOCUMENTS

| 3,840,093 | A | 10/1974 | Hamayasu | |
| 6,437,030 | B1* | 8/2002 | Coran et al. .................. | 524/101 |
| 2006/0144656 | A1 | 7/2006 | Lin | |
| 2007/0045967 | A1* | 3/2007 | Park .............................. | 277/534 |
| 2009/0071764 | A1* | 3/2009 | Fabris .......................... | 188/71.6 |
| 2012/0027990 | A1* | 2/2012 | Kobe et al. .................... | 428/119 |

FOREIGN PATENT DOCUMENTS

| EP | 2030806 | 3/2009 |
| JP | 1275646 | 11/1989 |
| JP | 2003268182 | 9/2003 |
| JP | 2005053956 | 3/2005 |
| SU | 1445160 | 9/1992 |

OTHER PUBLICATIONS

European Search Report, Appln. No. EP 11425122.6-2425, dated Oct. 19, 2011.
Struktol WS280, Technical Data Sheet—www.struktol.com, 4.19-1-01-01-(3).
Pages From Wikipedia, the free encyclopedia, Aramidic, Fibres.
Graphistrength C100, GraphiStrength Advanced Materials, ARKEMA Sep. 2008—Rev. 4.
Baytubes C150P, Datasheet, 3 pgs., Edition Jul. 5, 2010, replaces edition dated Feb. 24, 2009.
VAROX, Peroxide Brochure, Jun. 18, 2010.
NRC Material Safety Data Sheet, TAIC KS, Reviewed on Nov. 30, 2005.
NRC Material Safety Data Sheet, NORPEROX DBPH-45 Reviewed on Jul. 23, 2004.
DUPONT—Viton GF-600S, Technical Information—Rev. 3, Jul. 2010.
LANXESS—Product Specification—THERBAN AT 3443 VP (Trial Product) Issue number: LXS 06 / Date of issue: Jan. 1, 2010 / Previous issue from Jul. 1, 2009.

* cited by examiner

Primary Examiner — Pamela Rodriguez
(74) Attorney, Agent, or Firm — Volpe and Koenig, P.C.

(57) ABSTRACT

A brake pad obtainable by peroxide cross-linking with a mixture comprising: a polymeric base having from 10 to 40 parts by weight of hydrogenated acrylonitrile-butadiene rubber (HNBR); from 90 to 60 parts by weight of a vinylidene fluoride-hexafluoropropylene-tetrafluoroethylene terpolymer; and, fibers from 5 to 15 parts by weight per 100 parts by weight of polymeric base.

16 Claims, 4 Drawing Sheets

BRAKE PAD FOR A BICYCLE

BACKGROUND OF THE INVENTION

The present invention relates to a brake pad for a bicycle.

In the field of racing bicycles the use is now widespread of components made of composite materials, such as for example materials made up of carbon fibres embedded in a matrix of polymeric material. Amongst the components made with these materials, rims for bicycle wheels are highly appreciated because of the excellent combination of strength, elasticity and lightness that it is possible to achieve.

However, it has been found by the inventors of the present invention that the rims made in this way require brake pads having high performance, both in dry and in wet conditions.

The inventors of the present invention have also found that rims made of composite materials, in particular of carbon fibre, can have problems after intense braking action due to two main factors. The brake pads, in fact, rubbing on the rim, can cause an abrasion of the rim and generate heat up to 200° C. that alters the mechanical characteristics of the polymeric matrix in which the carbon fibres are embedded. Delamination of the rim can thus occur. In extreme cases the rim can break or braking may not occur with serious consequences for the safety of the cyclist.

Finally, it has been found by the inventors of the present invention that known pads obtained by cross-linking a mixture comprising: rubber consisting of a polymer selected from acrylonitrile-butadiene (NBR), hydrogenated acrylonitrile-butadiene (HNBR), styrene-butadiene (SBR), ethylene-propylene (EPR, EPDM), chloroprene (CR), or combinations thereof, cork and expanded natural graphite having a high heat conductivity, as described for example in European patent EP 2030806 in the name of the same Applicant, have a braking performance and a wear resistance that are not entirely satisfactory, in particular when used with the aforementioned rims made of composite material.

The problem underlying the present invention is that of overcoming the aforementioned problems, improving the braking performance of the pad both in dry and in wet conditions, ensuring at the same time a lower wear of the pad.

Consequently, the present invention relates, in a first aspect thereof, to a brake pad, in a second aspect thereof, to a wheel-brake assembly, and in a third aspect thereof, to a mixture for the preparation of a brake pad.

BRIEF DESCRIPTION OF THE DRAWINGS

Additional features and advantages of the invention will become more clearly apparent from the following description of some preferred embodiments thereof, made with reference to the attached drawings. In the drawings.

DESCRIPTION OF PREFERRED EMBODIMENTS

Introduction

Figure 1:
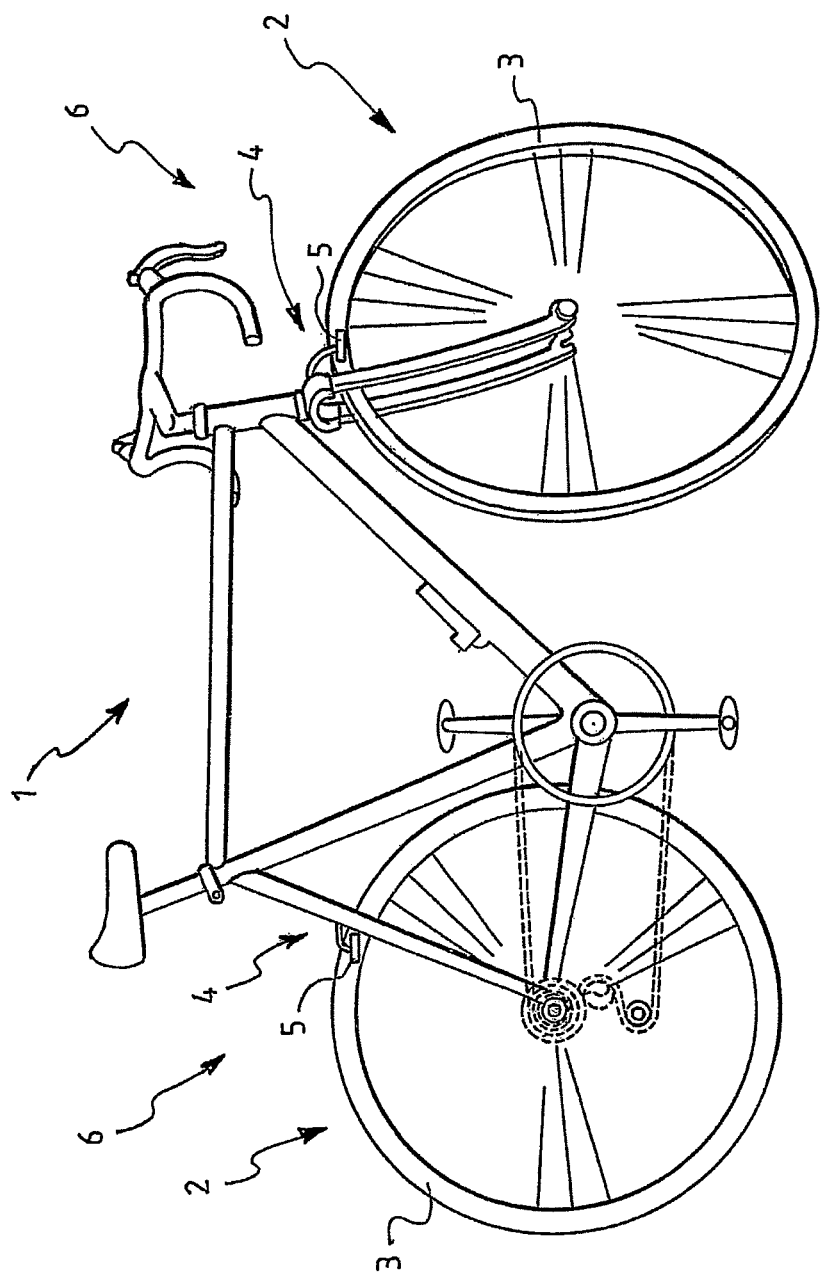
FIG. 1 shows a bicycle comprising a front wheel-brake assembly and a rear wheel-brake assembly.

Within the framework of the present description and in the subsequent claims, all numbers expressing amounts, parameters, percentages, and so forth, are to be understood as being preceded in all instances by the term "about" unless indicated otherwise. Also, all the ranges of numerical entities include all the possible combinations of the maximum and minimum numerical values and all the possible intermediate ranges therein, in addition to those specifically indicated herein.

As used herein, the term: hydrogenated acrylonitrile-butadiene rubber (HNBR) is used to indicate a totally or partially saturated nitrile rubber.

HNBR rubber is obtained by the hydrogenation of nitrile rubber (NBR) that belongs to a group of unsaturated types of rubber based on polymeric compounds of acrylonitrile and butadiene.

As used herein, the term: vinylidene fluoride-hexafluoro-propylene-tetrafluoroethylene terpolymer (fluorinated terpolymer) is used to indicate a fluoroelastomer containing, by weight, fluorine comprised between 64% and 72% and cross-linkable with a peroxide system.

The inventors of the present invention have found that the high coefficient of the HNBR rubber in the mixture substantially increases the braking performance of the pad, in particular in wet conditions, the braking is too powerful, noisy and dangerous to the safety of the cyclist.

The inventors of the present invention have thus surprisingly found that by using a polymeric base comprising, in addition to the HNBR rubber, also the aforementioned fluoroelastomer, a pad is obtained which has an optimal braking performance and, above all, constant over time. Although not wishing to be bound by any interpretive theory, the inventors consider that by combining the HNBR rubber with the aforementioned fluoroelastomer it is possible to obtain an optimal balancing of the braking characteristics with an improvement of heat resistance and of wear-resistance with respect to conventional pads.

In particular, it was observed that the braking performance both in dry and in wet conditions of the pads of the present invention is greatly improved with respect to conventional pads, as will be discussed in more detail in the following description.

Preferably, the polymeric base comprises from 15 to 30 parts by weight of the aforementioned HNBR rubber per 100 parts by weight of polymeric base.

Preferred examples of HNBR rubber that can be used in the present invention and that are commercially available are the Hydrogenated Butadiene Acrylonitrile copolymer products available from Lanxess Corporation under the brand name Therban®, with Therban® AT3443 VP being the currently preferred product.

Preferably, the polymeric base comprises from 85 to 70 parts by weight of the aforementioned fluorinated terpolymer per 100 parts by weight of polymeric base.

Preferred examples of terpolymers that can be used in the present invention and that are commercially available are the du Pont products available under the brand name Viton® of which Viton® GBL 600 and Viton® GF 600 are currently preferred.

As used herein, the term: peroxide cross-linking system is used to indicate a cross-linking system comprising a peroxide and a cross-linking activator, such as for example triallyl isocyanurate.

Preferably, the peroxide cross-linking system comprises: from 1 to 4 parts by weight of peroxide and from 1 to 5 parts by weight of activator per 100 parts by weight of polymeric base.

A preferred example of peroxide cross-linking system that can be used in the present invention and that is commercially available from Nordmann, Rassmann under the brand name Norperox DBPH-45 (2,5-Dimethyl-2,5-di-(ter-butylperoxy) hexane), which also supplies the activator under the brand name TAIC® KS (triallyl isocyanurate). Other peroxide cross-linking agents are commercially available from R.T. Vanderbilt Company under the Varox® brand, of which can be advantageously used are: Varox® 130 XL (2,5-dimethyl-2-5-Di(t-butyl-peroxy)diethylacetylene), Varox® 802-40KE (alpha-alpha-Di(t-butyl-peroxy)diisopropylbenzene) and Varox® DCP-40KE (dicumyl peroxide) and other commercially available activators which can be advantageously used are: triallylcyanurate (TAC®) and Trimethylallyl isocyanurate (TMAIC®), all of which are available from Nordmann, Rassmann.

With the peroxide cross-linking, a simultaneous cross-linking is obtained both on the fluoroelastomer and on the HNBR rubber.

Within the framework of the present description and in the subsequent claims, the term: fibres is used to indicate fibres selected from the group consisting of: cellulose, nylon, polyester, polyacrylonitrile (PAN), poly(p-phenylene-2,6-benzobisoxazole) (Zylon®) and aramidic fibres. Aramidic fibres are particularly preferred, more preferably para and/or meta aramidic fibres.

Preferably, the pad is made of a mixture in which the aramidic fibres, more preferably para and/or meta aramidic fibres, have an average length of 1 mm, an average diameter of 5-20 μm and an orientation that on average is longitudinal with respect to the longitudinal extension of the body of the pad.

The aramidic fibres advantageously carry out both a reinforcing function, and a balancing function of the braking performance that can be obtained by means of the aforementioned polymeric base.

Preferably, the total amount of fibres in the mixture is between 5 and 10 parts by weight per 100 parts by weight of polymeric base.

Examples of preferred para and meta aramidic fibres that can be used in the present invention and that are commercially available are the du Pont products available under the Nomex®, Kevlar® brands, or Teijin products under the brand names Twaron® and Teijinconex®.

According to a preferred embodiment, the pad is made of a mixture comprising, in addition to the aforementioned ingredients, a total amount of multi-wall carbon nanotubes (MWCNT) comprised between 1 and 4 parts by weight per 100 parts by weight of polymeric base.

It has been found that by using carbon nanotubes (MWCNT) an increase in the heat conductivity of the pad may be achieved which advantageously provides an improved dispersion of the heat responsible for the decrease in rigidity and mechanical strength of the polymeric matrix in which the carbon fibres are embedded. Moreover, the MWCNT also provide a high reinforcing action which allows the use of a smaller amount of fibres in the mixture, with the advantage of a lower abrasion of the rims.

Examples of preferred MWCNT that can be used in the present invention that are commercially available are the Bayer MaterialScience AG product under the brand name Baytubes® C150P and the Arkema Inc. product under the brand name Graphistrength® C100.

According to another preferred embodiment, the pad is made of a mixture comprising, in addition to the aforementioned ingredients, a total amount of fillers, selected from the group consisting of MgO, ZnO, $Ca(OH)_2$ and mixtures thereof, comprised between 1 and 5 parts by weight per 100 parts by weight of polymeric base. Advantageously, the use of MgO, ZnO and $Ca(OH)_2$ helps the peroxide cross-linking.

According to another preferred embodiment, the pad is made of a mixture comprising, in addition to the aforementioned ingredients, a total amount of talc comprised between 3 and 8 parts by weight per 100 parts by weight of polymeric base. Advantageously, the talc carries out a lubricating action that contributes to achieve an optimal braking balancing.

According to another preferred embodiment, the pad is made of a mixture comprising, in addition to the aforementioned ingredients, a total amount of CaO comprised between 3 and 7 parts by weight per 100 parts by weight of polymeric base. The calcium oxide is a weakly reinforcing filler and it advantageously acts as an acceptor of the humidity which forms during the peroxide cross-linking.

According to another preferred embodiment, the pad is made of a mixture comprising, in addition to the aforementioned ingredients, a total amount of expanded graphite comprised between 1 and 4 parts by weight per 100 parts by weight of polymeric base.

It has advantageously been found that by using expanded graphite both an increase in heat conductivity of the pad and a lubricating action during braking are achieved.

According to a further preferred embodiment, the pad is made of a mixture comprising, in addition to the aforementioned ingredients, a total amount of carnauba wax comprised between 0.5 and 2 parts by weight per 100 parts by weight of polymeric base and of organosilicones comprised between 0.5 and 2 parts by weight per 100 parts by weight of polymeric base. The aforementioned ingredients are advantageously used as processing aids and moulding detachers.

Examples of preferred organosilicones that can be used in the present invention and that are commercially available are the Struktol Company of America products under the Struktol® brand, preferably Struktol® WS 280 (condensation product of fatty acids derivatives and silicones (75%) on an inorganic support (25%), Shill-Seilacher).

According to another preferred embodiment, the pad is made of a mixture comprising:

a) a polymeric base including from 15 to 25 parts by weight of hydrogenated acrylonitrile-butadiene rubber (HNBR) and from 85 to 75 parts by weight of a fluorinated terpolymer, and b) from 8 to 10 parts by weight of para and meta aramidic fibres, from 2 to 4 parts by weight of triallyl isocyanurate, from 2 to 3 parts by weight of peroxide, from 1 to 3 parts by weight of carbon nanotubes MWCNT per 100 parts by weight of polymeric base.

This mixture has proven to be particularly suitable for promoting better braking performance both in dry and wet ground conditions with respect to conventional pads.

The pads according to the invention can be manufactured by means of techniques known to one skilled in the art. In particular, the mixture of the pads can be obtained by mechanically mixing the various ingredients in a two-cylinder mixer according to techniques well-known to a man skilled in the art.

Preferably, the mixture is then moulded and cross-linked under compression according to techniques well-known to one skilled in the art to form the pad. Alternatively, the mixture is moulded and cross-linked by injection-compression moulding according to techniques well-known to the man skilled in the art.

When the mixture is inserted in the hot mould at 175° C., about 90% of the peroxide breaks down generating free radicals that create C—C bonds between the macromolecules of the fluoroelastomer and of the HNBR rubber, thus allowing them to be cross-linked. Thereafter, the pad is subjected to post-cross-linking at 150° C. for 24 hours to complete the process, consuming the remaining peroxide.

In its second aspect, the present invention more specifically relates to a wheel-brake assembly for a bicycle, comprising:
a wheel, including a rim having two opposite sides; and
a brake, including two brake pads, intended to be actuated during braking in the sense of pressing respective braking surfaces of the pads against the sides of the rim;
wherein each pad is a pad as described above.

Preferably, the rim is made of composite material, more preferably carbon fibre, since it is with this type of rim that the advantages of the invention are most appreciable.

Preferably, each pad is mounted on the respective brake by means of a pad-carrying support.

In its third aspect, the present invention more specifically relates to a cross-linkable mixture for preparing a brake pad for a brake of a bicycle, as described above.

DETAILED DESCRIPTION WITH REFERENCE TO THE DRAWINGS

In FIG. 1, a bicycle 1 is represented, comprising a pair of wheels 2, each of which comprises a rim 3. A brake 4 is provided for each wheel 2 and comprises at least one brake pad, more preferably a pair of brake pads 5, intended to act on sides 8 (see FIG. 3) of the rim 3 by friction as a result of a movement driven by a brake control system (conventional per se and not illustrated), thus carrying out the braking of the wheel.

The rim 3 is made of composite material, for example of the type which comprises structural fibres embedded in a polymeric material. Typically, the structural fibres are selected from the group consisting of carbon fibres, glass fibres, aramidic fibres, ceramic fibres, boron fibres and combinations thereof. Carbon fibres are particularly preferred.

The arrangement of said structural fibres in the polymeric material can be a random arrangement of pieces or small sheets of structural fibres, an ordered substantially unidirectional arrangement of fibres, an ordered substantially bidirectional arrangement of fibres or a combination of the same.

Preferably, the polymeric material is thermosetting and preferably comprises an epoxy resin. However, this does not rule out the possibility of using a thermoplastic material.

The rim 3 in general is made by overlapping a plurality of sheets of composite material that stick together thanks to the common resin.

The rim 3 and the pad 5 are the essential elements of a wheel-brake assembly 6 of the bicycle 1.

Figure 2:
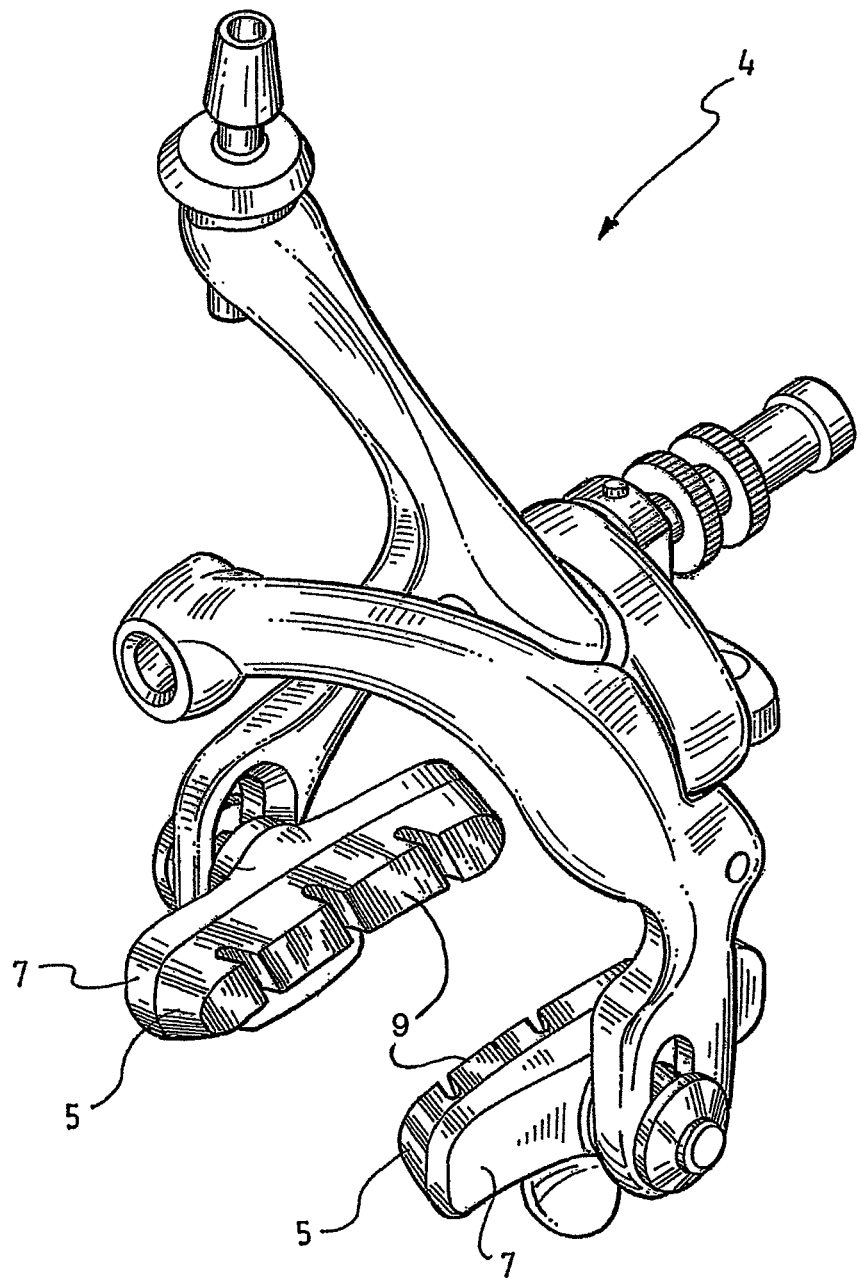
FIG. 2 shows a brake of the bicycle of FIG. 1 in a perspective view.

FIG. 2 shows in greater detail the brake 4 which comprises a pad-carrying support 7 by means of which each pad 5 is mounted in the brake 4.

Figure 3:
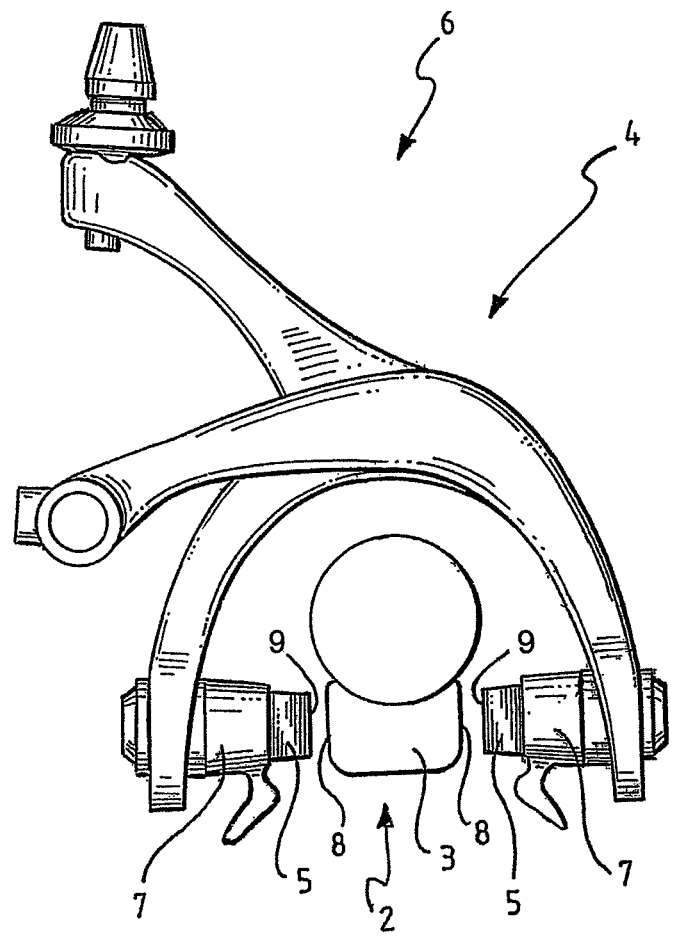
FIG. 3 shows a wheel-brake assembly of the bicycle of FIG. 1, represented in a rest configuration.

FIG. 3 schematically illustrates the mutual assembly position of the brake 4 and of the wheel 2 on the bicycle 1 in rest condition, i.e. when the pad 5 does not act upon the sides 8 of the rim 3.

Figure 4:
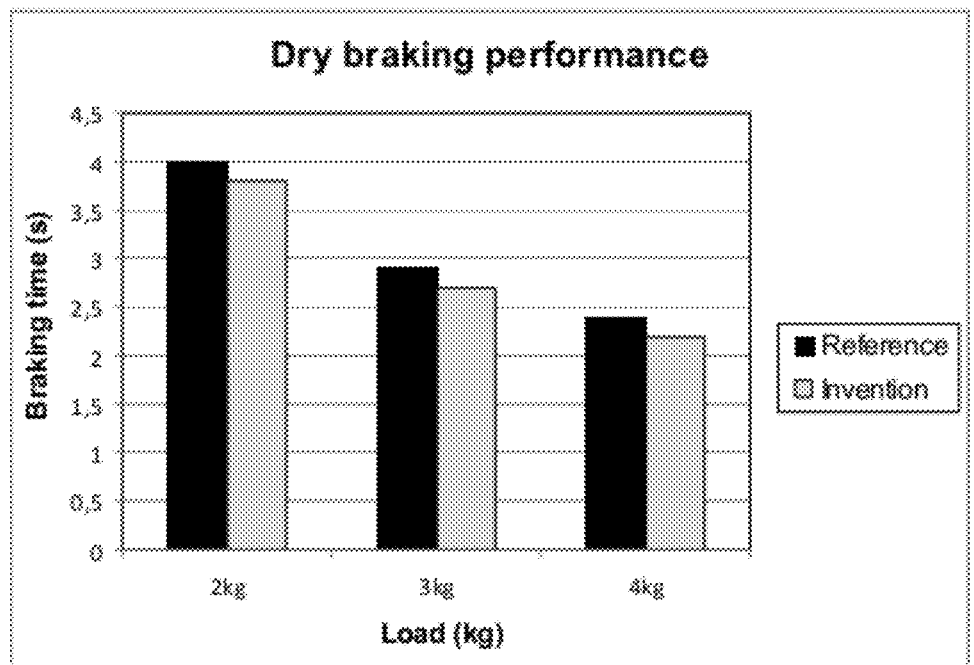
FIG. 4 shows the braking performance in dry conditions of the pads according to the present invention compared with conventional pads.
Figure 5:
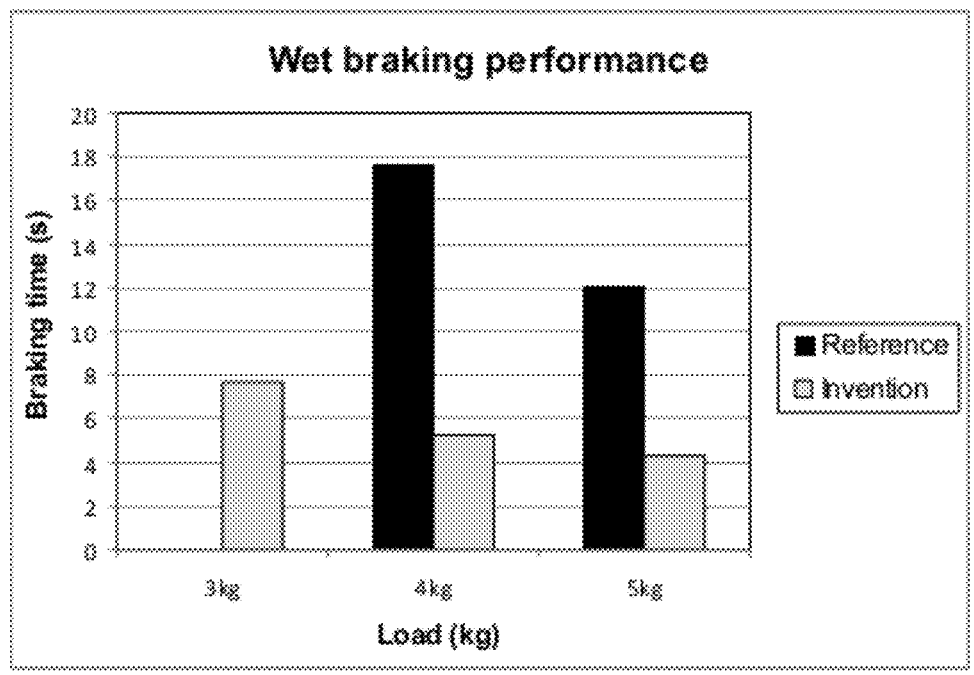
FIG. 5 shows the braking performance in wet conditions of the pads according to the present invention compared with conventional pads.

FIGS. 4 and 5 illustrate the results of the tests concerning the braking performance both in dry and in wet conditions of pads according to the present invention compared with conventional pads according to the following experimental protocol.

Braking Performance in Dry and Wet Conditions and Wear of the Pad

A pad according to the invention, obtained by means of fabrication techniques known to one skilled in the art, was prepared using a mixture comprising:
a) a polymeric base including 20 parts by weight of hydrogenated acrylonitrile-butadiene rubber (HNBR) and 80 parts by weight of a vinylidene fluoride-hexafluoropropylene-tetrafluoroethylene terpolymer, and
b) 9 parts by weight of para and meta aramidic fibres, 5 parts by weight of talc, 4 parts by weight of calcium oxide, 3 parts by weight of triallyl isocyanurate, 2.5 parts by weight of peroxide, 2 parts by weight of carbon nanotubes MWCNT, 1 part by weight of magnesium oxide, 1 part by weight of calcium hydroxide, 1 part by weight of zinc oxide, 0.5 parts by weight of powdered carnauba wax and 0.5 parts by weight of organosilicones, per 100 parts by weight of polymeric base.

The braking tests were carried out using commercially available Campagnolo® carbon fibre wheels sold under the brands Bora™, Ultra™ Two™ tubular, and Hyperon™ Ultra™ clincher, and the brakes and brake pads were produced in the known way. The wheel was connected to a flywheel mass (to simulate the weight of a cyclist) and it was then made to rotate horizontally at about 280 revs/minute (rpm). By applying a variable load to the brake assembly (2-3-4 kg for the test in dry conditions and 3-4-5 kg for the tests in wet conditions), to press the braking surface 9 against the rim, the times needed to decrease the rotation of the wheel from 280 rpm to 90 rpm were measured. In order to simulate the wet effect, water was sprayed on the surface of the rim close to the brakes.

The wear of the pads was evaluated as a weight loss (g) after a series of approximately 300 brakings, both in dry and in wet test conditions. The pads were weighed before being subjected to the wearing process. At the end of the aforementioned cycles, the pads were weighed again and the weight loss (g) was evaluated as a wear measurement thereof.

The braking and wear tests of a pad according to the present invention (invention) were compared with the performance of known Campagnolo pads, having the commercial code BR-RE701 and comprised by weight: 30%-40% rubber, 40%-60% cork and 4%-20% expanded natural graphite having high heat conductivity (reference), that were tested with the same wheels and with the same methodology used for the pad object of the invention.

The test results are shown in Tables 1 and 2. Table 1 shows the braking performance of the pads tested on a Campagnolo Bora™ Ultra™ Two™ rim made of carbon fibre; Table 2 shows the braking performance on a Campagnolo Hyperon™ Ultra™ clincher rim made of carbon fibre.

TABLE 1

| Pad | Braking times in dry conditions (s) | | | Braking times in wet conditions (s) | | | Wear (g) |
|---|---|---|---|---|---|---|---|
|  | 2 kg | 3 kg | 4 kg | 3 kg | 4 kg | 5 kg |  |
| Reference | 4 | 2.9 | 2.4 | / | 17.7 | 12.1 | 0.70 |
| Invention | 3.8 | 2.7 | 2.2 | 7.7 | 5.3 | 4.3 | 0.30 |

The pads of the invention showed a braking performance in dry conditions which was 5-8% better than the conventional reference pads. Moreover, they showed a much better performance in wet conditions, up to 70% better, with respect to the reference pad, ensuring a lower wear of the pad.

TABLE 2

| Pad | Braking times in dry conditions (s) | | | Braking times in wet conditions (s) | | | Wear (g) |
|---|---|---|---|---|---|---|---|
| | 2 kg | 3 kg | 4 kg | 3 kg | 4 kg | 5 kg | |
| Reference | 4.8 | 3.2 | 2.5 | / | 19.8 | 14.7 | 0.70 |
| Invention | 4.3 | 2.8 | 2.2 | 35.1 | 14.6 | 6.3 | 0.30 |

The pads of the invention showed a braking performance in dry conditions which was 10-12% better than the conventional reference pads. Moreover, they showed a performance in wet conditions which was 30-60% better with respect to the reference pad, ensuring a lower wear of the pad.

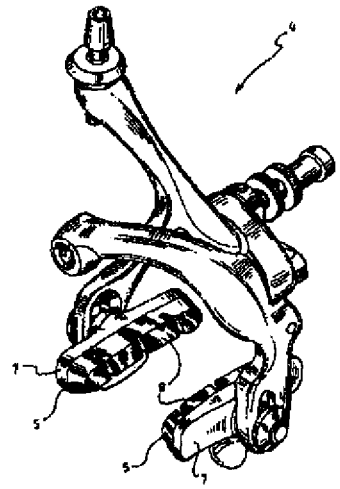

The invention claimed is:

1. Brake pad for a bicycle wheel-brake assembly, obtainable by cross-linking with a peroxide cross-linking system a mixture comprising:
   a) a polymeric base including 10 to 40 parts by weight of hydrogenated acrylonitrile-butadiene rubber (HNBR) and 90 to 60 parts by weight of a vinylidene fluoride-hexafluoropropylene-tetrafluoroethylene terpolymer, and
   b) a total amount of fibres from 5 to 15 parts by weight per 100 parts by weight of polymeric base.

2. Pad according to claim 1, wherein said fibres are selected from the group consisting of: cellulose, nylon, polyester, polyacrylonitrile (PAN), poly(p-phenylene-2,6-benzobisoxazole) and aramidic fibres.

3. Pad according to claim 2, wherein said fibres are aramidic fibres.

4. Pad according to claim 3, wherein said fibres have an average length of 1 mm.

5. Pad according to claim 3, wherein said fibres have an average diameter of 5-20 μm.

6. Pad according to claim 3, wherein said fibres have an orientation that on average is longitudinal with respect to the pad itself.

7. Pad according to claim 1, wherein the peroxide cross-linking system comprises:
   from 1 to 4 parts by weight of peroxide per 100 parts by weight of polymeric base and from 1 to 5 parts by weight of activator per 100 parts by weight of polymeric base.

8. Pad according to claim 1, wherein said mixture further comprises a total amount of carbon nanotubes (MWCNT) comprised between 1 and 4 parts by weight per 100 parts by weight of polymeric base.

9. Pad according to claim 1, wherein said mixture further comprises a total amount of fillers, selected from the group consisting of: MgO, ZnO, Ca(OH)$_2$ and mixtures thereof, comprised between 1 and 5 parts by weight per 100 parts by weight of polymeric base.

10. Pad according to claim 1, wherein said mixture further comprises a total amount of talc comprised between 3 and 8 parts by weight per 100 parts by weight of polymeric base.

11. Pad according to claim 1, wherein said mixture further comprises a total amount of CaO comprised between 3 and 7 parts by weight per 100 parts by weight of polymeric base.

12. Pad according to claim 1, wherein said mixture further comprises a total amount of expanded graphite comprised between 1 and 4 parts by weight per 100 parts by weight of polymeric base.

13. Pad according to claim 1, wherein said mixture comprises:
   a) a polymeric base including from 15 to 25 parts by weight of hydrogenated acrylonitrile-butadiene rubber (HNBR) and from 85 to 75 parts by weight of a vinylidene fluoride-hexafluoropropylene-tetrafluoroethylene terpolymer, and
   b) from 8 to 10 parts by weight of para and meta aramidic fibres, from 2 to 4 parts by weight of triallyl isocyanurate, from 2 to 3 parts by weight of peroxide, from 1 to 3 parts by weight of carbon nanotubes MWCNT per 100 parts by weight of polymeric base.

14. Wheel-brake assembly for a bicycle, comprising:
   a wheel, including a rim having two opposite sides; and
   a brake, including two brake pads, intended to be actuated during braking in the sense of pressing respective braking surfaces of the pads against the sides of the rim;
   wherein each pad is a pad obtainable by cross-linking with a peroxide cross-linking system a mixture comprising:
   a) a polymeric base including 10 to 40 parts by weight of hydrogenated acrylonitrile-butadiene rubber (HNBR) and 90 to 60 parts by weight of a vinylidene fluoride-hexafluoropropylene-tetrafluoroethylene terpolymer, and
   b) a total amount of fibres from 5 to 15 parts by weight per 100 parts by weight of polymeric base.

15. Assembly according to claim 14, wherein the rim is made of a composite material including carbon fibre.

16. Cross-linkable mixture for preparing a brake pad for a brake of a bicycle, comprising:
   a) a polymeric base including from 10 to 40 parts by weight of hydrogenated acrylonitrile-butadiene rubber (HNBR) and from 90 to 60 parts by weight of a vinylidene fluoride-hexafluoropropylene-tetrafluoroethylene terpolymer, and
   b) a total amount of fibres from 5 to 15 parts by weight per 100 parts by weight of polymeric base.

* * * * *

UNITED STATES PATENT AND TRADEMARK OFFICE
CERTIFICATE OF CORRECTION

PATENT NO. : 8,636,116 B2
APPLICATION NO. : 13/462495
DATED : January 28, 2014
INVENTOR(S) : Paolo Fabris Page 1 of 2

It is certified that error appears in the above-identified patent and that said Letters Patent is hereby corrected as shown below:

The title page should be deleted and substitute therefor the attached title page.

On the title page, Item (75), under "Inventors", in Column 1, Line 1, delete "Brendola (IT)" and insert -- Brendola – VI (IT) --.

IN THE CLAIMS

Col. 8, lines 50-51
After claim 16, claims 17 and 18 should be inserted:
-- 17. Pad according to claim 3, wherein the aramidic fibres are para aramidic fibres.
18. Pad according to claim 3, wherein the aramidic fibres are meta aramidic fibres. --.

Signed and Sealed this
Fourteenth Day of October, 2014

Michelle K. Lee
*Deputy Director of the United States Patent and Trademark Office*

(12) United States Patent
Fabris

(10) Patent No.: US 8,636,116 B2
(45) Date of Patent: Jan. 28, 2014

(54) BRAKE PAD FOR A BICYCLE

(75) Inventor: Paolo Fabris, Brendola (IT)

(73) Assignee: Campagnolo S.r.l., Vicenza (IT)

( * ) Notice: Subject to any disclaimer, the term of this patent is extended or adjusted under 35 U.S.C. 154(b) by 42 days.

(21) Appl. No.: 13/462,495

(22) Filed: May 2, 2012

(65) Prior Publication Data
US 2012/0279810 A1 Nov. 8, 2012

(30) Foreign Application Priority Data

May 2, 2011 (EP) .................. 11425122

(51) Int. Cl.
*B62L 1/02* (2006.01)

(52) U.S. Cl.
USPC .............. 188/24.12; 188/251 A; 523/149

(58) Field of Classification Search
USPC ........ 188/24.12, 24.11, 24.13, 251 A, 250 B; 428/172; 523/149, 150, 152, 155–157
See application file for complete search history.

(56) References Cited

U.S. PATENT DOCUMENTS

| | | | |
|---|---|---|---|
| 3,840,093 A | 10/1974 | Hamayasu | |
| 6,437,030 B1 * | 8/2002 | Coran et al. | 524/101 |
| 2006/0144656 A1 | 7/2006 | Lin | |
| 2007/0045967 A1 * | 3/2007 | Park | 277/534 |
| 2009/0071764 A1 * | 3/2009 | Fabris | 188/71.6 |
| 2012/0027990 A1 * | 2/2012 | Kobe et al. | 428/119 |

FOREIGN PATENT DOCUMENTS

| | | |
|---|---|---|
| EP | 2030806 | 3/2009 |
| JP | 1275646 | 11/1989 |
| JP | 2003268182 | 9/2003 |
| JP | 2005053956 | 3/2005 |
| SU | 1445160 | 9/1992 |

OTHER PUBLICATIONS

European Search Report, Appln. No. EP 11425122.6-2425, dated Oct. 19, 2011.
Struktol WS280, Technical Data Sheet—www.struktol.com, 4.19-1-01-01-(3).
Pages From Wikipedia, the free encyclopedia, Aramidic, Fibres.
Grnphistrength C100, GraphiStrength Advanced Materials, ARKEMA Sep. 2008—Rev. 4.
Baytubes C150P, Datasheet, 3 pgs., Edition Jul. 5, 2010, replaces edition dated Feb. 24, 2009.
VAROX, Peroxide Brochure, Jun. 18, 2010.
NRC Material Safety Data Sheet, TAIC KS, Reviewed on Nov. 30, 2005.
NRC Material Safety Data Sheet, NORPEROX DBPH-45 Reviewed on Jul. 23, 2004.
DUPONT—Viton GF-600S, Technical Information—Rev. 3, Jul. 2010.
LANXESS—Product Specification—THERBAN AT 3443 VP (Trial Product) Issue number: LXS 06 / Date of issue: Jan. 1, 2010 / Previous issue from Jul. 1, 2009.

* cited by examiner

*Primary Examiner* — Pamela Rodriguez
(74) *Attorney, Agent, or Firm* — Volpe and Koenig, P.C.

(57) ABSTRACT

A brake pad obtainable by peroxide cross-linking with a mixture comprising: a polymeric base having from 10 to 40 parts by weight of hydrogenated acrylonitrile-butadiene rubber (HNBR); from 90 to 60 parts by weight of a vinylidene fluoride-hexafluoropropylene-tetrafluoroethylene terpolymer; and, fibers from 5 to 15 parts by weight per 100 parts by weight of polymeric base.

18 Claims, 4 Drawing Sheets